(12) United States Patent
Kim et al.

(10) Patent No.: US 11,031,598 B2
(45) Date of Patent: Jun. 8, 2021

(54) BINDER FOR POSITIVE ELECTRODE OF LITHIUM-SULFUR SECONDARY BATTERY AND METHOD FOR PREPARING POSITIVE ELECTRODE USING SAME

(71) Applicant: LG CHEM, LTD., Seoul (KR)

(72) Inventors: Kyung Oh Kim, Daejeon (KR); Choonghyeon Lee, Daejeon (KR); Jeongae Yoon, Daejeon (KR); Sujee Kwon, Daejeon (KR); Doo Kyung Yang, Daejeon (KR); Sung Soo Yoon, Daejeon (KR)

(73) Assignee: LG CHEM, LTD., Seoul (KR)

(*) Notice: Subject to any disclaimer, the term of this patent is extended or adjusted under 35 U.S.C. 154(b) by 392 days.

(21) Appl. No.: 16/318,971

(22) PCT Filed: May 31, 2018

(86) PCT No.: PCT/KR2018/006194
§ 371 (c)(1),
(2) Date: Jan. 18, 2019

(87) PCT Pub. No.: WO2019/022359
PCT Pub. Date: Jan. 31, 2019

(65) Prior Publication Data
US 2020/0176775 A1    Jun. 4, 2020

(30) Foreign Application Priority Data
Jul. 26, 2017 (KR) .................. 10-2017-0094666

(51) Int. Cl.
| H01M 4/62 | (2006.01) |
|---|---|
| C08F 220/28 | (2006.01) |
| H01M 10/052 | (2010.01) |
| H01M 4/02 | (2006.01) |

(52) U.S. Cl.
CPC ......... *H01M 4/622* (2013.01); *C08F 220/286* (2020.02); *H01M 10/052* (2013.01); *C08F 2800/20* (2013.01); *H01M 2004/028* (2013.01)

(58) Field of Classification Search
None
See application file for complete search history.

(56) References Cited

U.S. PATENT DOCUMENTS

| 5,840,443 A | 11/1998 | Gregg et al. |
|---|---|---|
| 2009/0306304 A1 | 12/2009 | Fujimoto et al. |
| 2012/0189898 A1 | 7/2012 | Wakizaka et al. |
| 2015/0188129 A1 | 7/2015 | Park et al. |
| 2016/0233509 A1 | 8/2016 | Haeupler et al. |
| 2017/0110733 A1* | 4/2017 | Yoon ................ C09D 5/24 |
| 2018/0114988 A1 | 4/2018 | Yoon et al. |

FOREIGN PATENT DOCUMENTS

| CN | 103258990 A | 8/2013 |
|---|---|---|
| CN | 106602019 A | 4/2017 |
| EP | 3214675 A1 | 9/2017 |
| JP | 6-93239 A | 4/1994 |
| JP | 2008-45096 A | 2/2008 |
| JP | 2012-233059 A | 11/2012 |
| JP | WO2014/156195 A1 | 10/2014 |
| JP | 2015-128051 A | 7/2015 |
| JP | 2016-631971 A | 10/2018 |
| KR | 10-2012-0091029 A | 8/2012 |
| KR | 10-2013-0123831 A | 11/2013 |
| KR | 10-2015-0021482 A | 3/2015 |
| KR | 10-2015-0093874 A | 8/2015 |
| KR | 10-2017-0010623 A | 2/2017 |
| KR | 10-2017-0050078 A | 5/2017 |
| KR | 10-2017-0076298 A | 7/2017 |
| WO | WO 2010/003138 A1 | 1/2010 |
| WO | WO 2016/006945 A1 | 1/2016 |
| WO | WO 2016/067635 A1 | 5/2016 |
| WO | WO 2017/074004 A1 | 5/2017 |
| WO | WO 2019/066352 A2 | 4/2019 |
| WO | WO 2019/066352 A3 | 4/2019 |

OTHER PUBLICATIONS

Dirlam et al., "The Use of Polymers in Li—S Batteries: A Review", Journal of Polymer Science, Part A: Polymer Chemistry 2017, vol. 55, pp. 1635-1668.
European Search Report for Appl. No. 18837737.8 dated Jul. 5, 2019.
The Japanese Office Action, dated Jan. 20, 2020, for Japanese Application No. 2019-503456.

\* cited by examiner

*Primary Examiner* — Wyatt P McConnell

(74) *Attorney, Agent, or Firm* — Birch, Stewart, Kolasch & Birch, LLP

(57) ABSTRACT

A binder for a positive electrode of a lithium-sulfur secondary battery, including an acrylic polymer including an acrylic monomer polymerized unit, a non-acrylic monomer polymerized unit and a redox monomer polymerized unit, as well as a positive electrode active layer, a positive electrode and a lithium-sulfur secondary battery manufactured using the binder. The acrylic polymer contains at least 30 wt. % of the acrylic monomer polymerized unit.

15 Claims, No Drawings

BINDER FOR POSITIVE ELECTRODE OF LITHIUM-SULFUR SECONDARY BATTERY AND METHOD FOR PREPARING POSITIVE ELECTRODE USING SAME

TECHNICAL FIELD

The present application claims the benefit of priority based on Korean Patent Application No. 10-2017-0094666 filed on Jul. 26, 2017, all the contents of which is incorporated herein by reference.

The present invention relates to a binder for a positive electrode of a lithium-sulfur secondary battery and a method for preparing a positive electrode using the same.

BACKGROUND ART

As the application area of secondary batteries extends to electric vehicles (EVs) and energy storage systems (ESSs), lithium-ion secondary batteries having a relatively low energy storage density per weight (~250 Wh/kg) have limitations in application to such products. In contrast, since lithium-sulfur secondary batteries can achieve high energy storage density per weight (~2,600 Wh/kg), it is receiving attention as a next-generation secondary battery technology.

The lithium-sulfur secondary battery means a battery system which uses a sulfur-based material with S—S bond (Sulfur-Sulfur Bond) as a positive electrode active material and a lithium metal as a negative electrode active material. Sulfur, which is the main material of the positive electrode active material, has advantages of being an abundant resource, having no toxicity, and having a low atomic weight.

When the lithium-sulfur secondary battery is discharged, lithium which is the negative electrode active material releases an electron and is ionized and oxidized, and a sulfur-based material which is the positive electrode active material is reduced by accepting the electron. Here, the oxidation reaction of lithium is a process in which lithium metal release an electron and is converted into a lithium cation form. In addition, the reduction reaction of sulfur is a process in which the S—S bond accepts two electrons to be converted into a sulfur anion form. The lithium cation produced by the oxidation reaction of lithium is transported to the positive electrode through the electrolyte and combines with the sulfur anion produced by the reduction of sulfur to form a salt. Specifically, the sulfurs before discharging have an annular $S_8$ structure, and it is converted to lithium polysulfide ($LiS_x$) by the reduction reaction. When the lithium polysulfide is completely reduced, lithium sulfide ($Li_2S$) is produced.

Although the lithium-sulfur secondary battery has advantages in terms of energy storage density, there are various problems in practical application. Specifically, there may be the problem of instability of lithium metal used as a negative electrode, the problem of low conductivity of the positive electrode, the problem of sublimation of sulfur-based materials when manufacturing electrode, the problem of loss of sulfur-based materials during repetitive charging and discharging and the like. In particular, the problem of leaching of sulfur-based materials from the positive electrode is occurred as the lithium polysulfide produced from the positive electrode during discharging is transferred to the lithium metal surface of the negative electrode during charging and then reduced, and such problem must be overcome in order to commercialize the lithium-sulfur battery.

There have been various attempts in the art to suppress the leaching of such sulfur-based materials. For example, a method of adding an additive having a property of adsorbing sulfur to a positive electrode laminate, a method of surface-treating sulfur with a substance including hydroxide, oxyhydroxide of a coating element, oxycarbonate of a coating element or hydroxy carbonate of a coating element, a method of making a carbon material into a nanostructure and restricting lithium polysulfide thereto and the like may be mentioned.

However, in the case of adding the additive, there are problems of conductive degradation and the risk of side reaction. In the case of the surface treatment technology, there are disadvantages that the active material is lost during the treatment process and it is not preferable from the viewpoint of cost. In the case of a carbon nanostructure, there is a disadvantage that the manufacturing process is complicated.

In addition, there is a problem that these techniques in the prior art do not significantly improve the capacity and life characteristics of lithium-sulfur batteries

PRIOR ART LITERATURE (Patent Literature 1) Korean Laid-open Patent Publication No. 10-2015-0093874.

DISCLOSURE

Technical Problem

In order to solve the above problems, the present invention is intended to provide a binder for a positive electrode of a lithium-sulfur secondary battery, which can suppress the leaching of sulfur-based materials by forming a structure capable of providing a high adsorption force for a positive electrode active material and can increase the stability of the electrode by forming an electrode with low solubility for the electrolyte solution, and which is a water-soluble polymer and can inhibit the sublimation of sulfur-based materials through low drying temperature and short drying time when manufacturing the electrode.

Technical Solution

According to the first aspect of the present invention, the present invention provides a binder for the preparation of a positive electrode of a lithium-sulfur secondary battery, which comprises an acrylic polymer.

According to one embodiment of the present invention, the acrylic polymer includes an acrylic monomer polymerized unit, a non-acrylic monomer polymerized unit, and a redox monomer polymerized unit.

According to one embodiment of the present invention, the acrylic polymer contains 30 wt. % or more of the acrylic monomer polymerized unit.

According to one embodiment of the present invention, the acrylic monomer in the acrylic monomer polymerized unit contains 30 wt. % or more of the first acrylic monomer.

According to one embodiment of the present invention, the solubility of the first acrylic monomer in water at 25 is 20 wt. % or more.

According to one embodiment of the present invention, the acrylic monomer in the acrylic monomer polymerized unit further comprises 1 to 50 parts by weight of the second acrylic monomer based on 100 parts by weight of the first acrylic monomer.

According to one embodiment of the present invention, the solubility of the second acrylic monomer in water at is 10 wt. % or less.

According to one embodiment of the present invention, the acrylic polymer comprises 30 to 70 wt. % of the acrylic monomer polymerized unit, 20 to 50 wt. % of the non-acrylic monomer polymerized unit, and 1 to 20 wt. % of the redox monomer polymerized unit.

According to the second aspect of the present invention, the present invention provides a composition for the preparation of the positive electrode of the lithium-sulfur secondary battery, which comprises the binder, the positive electrode active material and the conductive material.

According to one embodiment of the present invention, the composition comprises 0.01 to 10 parts by weight of the binder based on 100 parts by weight of the solid content in the composition.

According to one embodiment of the present invention, the composition comprises 25 to 95 parts by weight of the positive electrode active material based on 100 parts by weight of the solid content in the composition.

According to one embodiment of the present invention, the composition comprises 2 to 70 parts by weight of the conductive material based on 100 parts by weight of the solid content in the composition.

According to a third aspect of the present invention, the present invention provides a positive electrode for a lithium-sulfur secondary battery, comprising a current collector and an active layer formed by applying the composition described above on the current collector, wherein the active layer has a thickness of 1 to 200 μm.

According to a fourth aspect of the present invention, the present invention provides a positive electrode including the positive electrode active layer and a lithium-sulfur secondary battery including the positive electrode.

Advantageous Effects

The binder for the positive electrode of the lithium-sulfur secondary battery according to the present invention assists in uniformly dispersing carbon used as a conductive material in the preparation of the positive electrode and forming the secondary structure and enables the positive electrode prepared using this to maintain a high adsorption capacity for the active material.

Since the binder has a low solubility in an electrolyte composed of an ether-based mixture, the positive electrode prepared using it can have high stability.

Since the binder is a water-soluble polymer and can be efficiently dried even at a low drying temperature and a short drying time in the drying step in the electrode preparation, it is possible to solve the problem of lowering the electrode capacity due to the sublimation of the sulfur-based material that may occur during the drying process of the electrode manufacturing.

Therefore, the lithium-sulfur secondary battery manufactured using the binder according to the present invention has excellent cycle characteristics.

BEST MODE

The embodiments provided in accordance with the present invention can be all achieved by the following description. It is to be understood that the following description describes a preferred embodiment of the present invention and that the present invention is not necessarily limited thereto.

The present invention provides a binder for the positive electrode of a lithium-sulfur secondary battery, comprising an acrylic polymer as a means to fundamentally inhibit the leaching of sulfur from the positive electrode of the lithium-sulfur secondary battery.

In the related art, polyvinylidene difluoride (PVDF), which has excellent electrochemical stability, is generally used as a binder for preparing the positive electrode of lithium-sulfur secondary battery. However, polyvinylidene difluoride has a low solubility in common solvents, and the choice of available solvents is limited due to these properties. A polar solvent having a high boiling point such as N-methylpyrrolidone (NMP) can be used as a soluble solvent of polyvinylidene difluoride. However, if such a polar solvent is used, when considering the fact that a long period of high-temperature drying is necessary for drying the battery, the use of the above-mentioned solvent is not preferable in that it may cause a problem of serious drop in electrode capacity due to the sublimation of sulfur in the drying process.

The binder including the acrylic polymer according to the present invention has a low solubility in an electrolyte composed of an ether-based mixture and thus physically adsorb the electrode material. In addition, the binder participates in the redox reaction of the polysulfide to help the change of sulfur from the liquid form, in which sulfur is easily leached, to the solid form, in which sulfur is difficult to leach sulfur, thereby preventing the electrode material from leaching into the electrolyte and thus being capable of forming a stable electrode. Since the acrylic polymer is a water-soluble polymer and thus makes it possible to dry the electrode at a temperature lower than the sublimation temperature of sulfur, the use of the binder comprising the acrylic polymer leads to excellent processability. The acrylic monomer constituting the acrylic polymer essentially contains a polar functional group indicating water solubility. This polar functional group has a strong interaction with sulfur, and thus can strongly inhibit the leaching of sulfur-based materials chemically.

Binder

The present invention provides a binder for the preparation of a positive electrode of a lithium-sulfur secondary battery, comprising an acrylic polymer. The acrylic polymer includes an acrylic monomer polymerized unit, a non-acrylic monomer polymerized unit, and a redox monomer polymerized unit. As used herein, the term "monomer polymerized unit" refers to a moiety derived from a particular monomer in the polymer, which means a moiety that constitutes a polymer. For example, the acrylic monomer polymerized unit refers to a portion derived from the acrylic monomer in the acrylic polymer, the non-acrylic monomer polymerized unit refers to a portion derived from the non-acrylic monomer in the acrylic polymer, and the redox monomer polymerized unit refers to a portion derived from the redox monomer in the acrylic polymer. The acrylic polymer according to the present invention is a linear polymer and is a copolymer of acrylic monomer, non-acrylic monomer and redox monomer, which has an acrylic monomer polymerized unit, a non-acrylic monomer polymerized unit and a redox monomer polymerized unit in the chain of the linear polymer according to the above description.

A compound containing "meth" in the present specification means that the "meth" is selectively described. For example, (meth) acrylic acid refers to methacrylic acid or acrylic acid, and (meth) acrylate refers to methacrylate or acrylate.

As used herein, "solubility" refers to the solubility measured by the solubility measurement method described below. The solubility is the measured solubility at room temperature (25° C.), even though there is no mention of temperature.

The acrylic polymer contains 30 wt. % or more of acrylic monomer polymerized unit. The acrylic monomer in the acrylic monomer polymerized unit contains 30 wt. % or more of the first acrylic monomer having a solubility of 20 wt. % or more in water. Here, the solubility of 20 wt. % in water means that a maximum of 20 g of the copolymer can be dissolved in 100 g of water. The first acrylic monomer helps the binder according to the present invention to have solubility above a certain level in water. When using a binder having a solubility of more than a certain level in water, since it is possible to dry the battery at a low temperature and a short time in the drying step in the preparation of the battery, the lowering of the electrode capacity can be minimized by suppressing the sublimation of the sulfur-based material that may occur during the preparation of the electrode. Therefore, when the first acrylic monomer is contained in an amount of less than 30 wt. %, it is not preferable because solubility of a certain amount of binder in water cannot be ensured. The first acrylic monomer is not particularly limited as long as its solubility in water is 20 wt. % or more, and the first acrylic monomer may be a compound having 1 to 18 carbon atoms. The first acrylic monomer may be preferably one or more compounds selected from alkylene oxide group-containing monomers such as alkoxy alkyleneglycol (meth)acrylic acid ester, alkoxy dialkyleneglycol (meth)acrylic acid ester and alkoxy polyethyleneglycol (meth)acrylic acid ester; amino group-containing monomer such as 2-aminoethyl (meth)acrylate hydrochloride and N, N-dimethylaminoethyl (meth)acrylate; hydroxy group containing monomer such as hydroxypolyalkyleneglycol (meth)acrylates such as 2-hydroxyethyl (meth)acrylate, hydroxypolyethyleneglycol (meth)acrylate and hydroxypolypropyleneglycol (meth)acrylate; and carboxy group containing monomers such as methyl (meth)acrylic acid.

The acrylic monomer in the acrylic monomer polymerized unit may further include the second acrylic monomer having a solubility of 10 wt. % or less in water. When the acrylic monomer comprises the second acrylic monomer, the second acrylic monomer may be included in an amount of 1 to 50 parts by weight, preferably 2 to 30 parts by weight, more preferably 3 to 10 parts by weight, based on 100 parts by weight of the first acrylic monomer. The second acrylic monomer helps to maintain proper solubility of the binder in water. When the second acrylic monomer is included within the above range, the binder can maintain the proper solubility in water. The second acrylic monomer is not particularly limited as long as its solubility in water is 10 wt. % or less, and may be preferably at least one compound selected from the group consisting of alkyl (meth)acrylate compounds having an alkyl group having 1 to 20 carbon atoms such as methyl (meth)acrylate, ethyl (meth)acrylate, n-propyl (meth)acrylate, isopropyl (meth)acrylate, n-butyl (meth)acrylate, t-butyl (meth)acrylate, isobutyl (meth)acrylate, 2-ethylhexyl (meth)acrylate, 2-ethylbutyl (meth)acrylate, pentyl (meth)acrylate, hexyl (meth)acrylate, cyclohexyl (meth)acrylate, n-octyl (meth)acrylate, isooctyl (meth)acrylate, isononyl (meth)acrylate, decyl (meth)acrylate, dodecyl (meth)acrylate, tridecyl (meth)acrylate, tetradecyl (meth) acrylate, octadecyl (meth)acrylate and isobornyl (meth)acrylate.

The acrylic polymer comprises a non-acrylic monomer polymerized unit. The non-acrylic monomer in the non-acrylic monomer polymerized unit generally means a monomer other than the acrylic monomer described above, and may be preferably selected from the group consisting of (meth)acrylamide, N-methyl (meth)acrylamide, N,N-dimethyl (meth)acrylamide, (meth)acrylonitrile, N-vinyl pyrrolidone, N-vinyl caprolactam, N-vinyl caprolactone, styrene, 2-vinyl pyridine, 4-vinyl pyridine and vinyl acetate. When the non-acrylic monomer is used in the preparation of acrylic polymer, the solubility in water after polymerization can be increased by increasing the degree of freedom in the mixing ratio of the first acrylic monomer and the second acrylic monomer, and thus the interaction with the sulfur-based materials, which is a positive electrode active material, can be enhanced to chemically inhibit the leaching of the sulfur-based materials.

The acrylic polymer includes a redox monomer polymerized unit. The redox monomer in the redox monomer polymerized unit means a monomer having both oxidizing and reducing properties at the same time, and may be preferably selected from the group consisting of catechol group containing compounds such as N-(3,4-dihydroxyphenylethyl) (meth)acrylamide; and ascorbic acid group containing compounds such as 2-(3,4-dihydroxy-2,5-dihydrofuranyl)-1-hydroxyethyl(meth)acrylate.

The acrylic polymer may comprise 30 to 70 wt. % of the acrylic monomer polymerized unit, 20 to 50 wt. % of the non-acrylic monomer polymerized unit and 1 to 20 wt. % of the redox monomer polymerized unit. By satisfying the mixing ratio of the above range, it is possible to have a high solubility in water while having a low solubility in an electrolyte which is an ether-based mixture. In this case, the binder may exhibit strong chemical interactions with the positive electrode active material. Also, it is possible to induce the conversion from a liquid form to a solid form by facilitating the reduction of the polysulfide, thereby inhibiting the leaching of sulfur-based materials.

The acrylic polymer has a solubility of 10 wt. % or more in water at 25° C. Since the binder containing the acrylic polymer is used together with water in the manufacture of the positive electrodes to induce uniform dispersion of carbon and the moisture can be efficiently removed even at a low drying temperature and a short drying time in the drying step, the capacity of the electrode can be maintained without loss of the positive electrode active material. In addition, the acrylic polymer has a solubility of 1 wt. % or less in an electrolyte at 25° C. When the acrylic polymer has the low solubility of the above range in the electrolyte, the positive electrode active material layer prepared using the binder comprising the acrylic polymer has excellent resistance to the electrolyte of the electrode and thereby the battery can exhibit high cycle stability.

The acrylic polymer has a glass transition temperature of −80 to 80° C., preferably a glass transition temperature of −50 to 80° C. When the acrylic polymer having the above glass transition temperature is used, it is possible to ensure adequate adhesion with the current collector, good physical adsorption of the electrode, and resistance to the electrolyte.

The acrylic polymer has a weight average molecular weight of 5,000 to 3,000,000. The weight average molecular weight is a value converted to standard polystyrene measured by GPC (Gel Permeation Chromatograph). Unless otherwise defined herein, the weight average molecular weight for a particular compound means the value measured by the above method.

The acrylic polymer may be prepared in various ways. The acrylic polymer can be polymerized by mixing the required monomers according to the above conditions, and then polymerizing the monomer mixture by solution polymerization, bulk polymerization, suspension polymerization or emulsion polymerization. According to one embodiment of the present invention, the above polymerization method may be preferably the solution polymerization. The specific conditions of the solution polymerization are not particularly limited as long as they are conditions known in the art, but the solvent for the solution polymerization may preferably be a solvent having a boiling point of 110° C. or less in order to use the polymer solution as it is without further purification process after solution polymerization. The solvent may be selected from the group consisting of acetone, methanol, ethanol, acetonitrile, isopropanol, methylethylketone and water. According to one embodiment of the present invention, the above-mentioned solvent may be preferably water in consideration of the above-mentioned boiling point and environmental effects.

Positive Electrode Active Layer

The present invention provides a positive electrode active layer formed from the composition comprising the binder, the positive electrode active material and the conductive material as described above.

The ratio of the binder in the composition may be selected in consideration of the performance of the desired battery. According to one embodiment of the present invention, the composition comprises 0.01 to 10 parts by weight of the binder based on 100 parts by weight of the solid content in the composition. The solid content in the composition as a basis of the content means the solid component in the composition except for the solvent, the monomer which can be contained in the binder, and the like. The binder comprises a binder comprising the acrylic polymer described above. The composition may further comprise a binder including a non-acrylic polymer in addition to the binder including the acrylic polymer. The non-acrylic polymer-containing binder plays a role in attaching the positive electrode active material to the current collector and in additionally imparting insolubility to the electrolyte. The binder comprising the non-acrylic polymer may be at least one binder selected from the group consisting of fluororesin-based binders including polyvinylidene fluoride (PVdF) or polytetrafluoroethylene (PTFE), rubber-based binders including styrene-butadiene rubber, acrylonitrile-butadiene rubber and styrene-isoprene rubber, polyalcohol-based binders, polyolefin-based binders including polyethylene and polypropylene, polyimide-based binders, polyester-based binders, mussel adhesive, silane-based binders. According to one embodiment of the present invention, the binder containing the non-acrylic polymer may be further added to the composition in an amount of 0.01 to 10.0 parts by weight based on 100 parts by weight of the solid content in the composition.

The ratio of the positive electrode active material in the composition may be selected in consideration of the performance of the desired battery. According to one embodiment of the present invention, the composition comprises 25 to 95 parts by weight of the positive electrode active material based on 100 parts by weight of the solid content in the composition. The positive electrode active material can be selected from, but is not necessarily limited to, elemental sulfur ($S_8$), sulfur-based compounds, or mixtures thereof. Specifically, the sulfur-based compound may be $Li_2S_n$ (n=1), an organic sulfur compound or a carbon-sulfur polymer (($C_2S_x)_n$: x=2.5~50, n=2), etc. Since the sulfur material alone does not have electrical conductivity, they are applied in combination with the conductive material.

The ratio of the conductive material in the composition may be selected in consideration of the performance of the desired battery. According to one embodiment of the present invention, the composition comprises 2 to 70 parts by weight of the conductive material based on 100 parts by weight of the solid content in the composition. The conductive material may be selected from, but is not limited to, graphite such as natural graphite or artificial graphite; carbon blacks such as carbon black, acetylene black, ketjen black, channel black, furnace black, lamp black, and summer black; conductive fibers such as carbon fiber and metal fiber; metal powders such as carbon fluoride, aluminum and nickel powder; conductive whiskers such as zinc oxide and potassium titanate; conductive metal oxides such as titanium oxide; polyphenylene derivatives.

The composition may further comprise other components in addition to the binder, the positive electrode active material and the conductive material described above. A crosslinking agent or a dispersant for the conductive material is a component which can be further added to the composition. The crosslinking agent may be a crosslinking agent having two or more functional groups capable of reacting with a crosslinkable functional group of the acrylic polymer so that the acrylic polymer of the binder forms a crosslinking network. The crosslinking agent is not particularly limited, but may be selected from an isocyanate crosslinking agent, an epoxy crosslinking agent, an aziridine crosslinking agent or a metal chelate crosslinking agent. According to one embodiment of the present invention, the crosslinking agent may be preferably an isocyanate crosslinking agent. The crosslinking agent may be further included in the composition in an amount of 0.0001 to 1 parts by weight, based on 100 parts by weight of the solid content in the composition.

The dispersant for the conductive material assists in dispersing the non-polar carbon-based conductive material to form a paste. The dispersant for the conductive material is not particularly limited but may be selected from the cellulose based compounds including carboxymethylcellulose (CMC), starch, hydroxypropyl cellulose, and regenerated cellulose. According to one embodiment of the present invention, the dispersant for the conductive material may be preferably carboxymethyl cellulose (CMC). The dispersant for the conductive material may be further included in the composition in an amount of 0.1 to 20 parts by weight based on 100 parts by weight of the solid content in the composition.

In forming the composition, a solvent may be used. The type of the solvent can be appropriately set in consideration of the performance of the desired battery, and the like. According to one embodiment of the present invention, the solvent may be selected from organic solvents such as N-methyl-2-pyrrolinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethyl sulfoxide, formamide, dimethylformamide, acetonitrile, nitromethane, methyl formate, methyl acetate, triester phosphate, trimethoxy methane, sulfolane, methyl sulfolane, 1,3-dimethyl-2-imidazolidinone, propylene carbonate derivatives, tetrahydrofuran derivatives, methyl propionate or ethyl propionate, and water. Since the binder of the present invention has a solubility of 10 wt. % or more in water, water is preferably used as a solvent in the present invention. When water is used as a solvent, it is advantageous in terms of drying temperature and environments.

The thickness of the active layer formed by the composition may be suitably selected in consideration of the desired performance and is not particularly limited. According to one embodiment of the present invention, it is preferable that the thickness of the active layer is 1 to 200 µm.

Lithium-Sulfur Secondary Battery

The present invention provides a lithium-sulfur secondary battery with improved cycle performance by preparing the positive electrode by forming the active layer on the current collector and then adding the construction of the negative electrode, the separator, and the electrolyte.

The positive electrode constituting the lithium-sulfur secondary battery according to the present invention comprises a positive electrode current collector and a positive electrode active layer formed on the positive electrode current collector. The positive electrode active layer is prepared according to the above-mentioned description. The positive electrode current collector is not particularly limited as long as it is generally used in the preparation of a positive electrode. According to one embodiment of the present invention, the type of the positive electrode current collector may be at least one material selected from stainless steel, aluminum, nickel, titanium, sintered carbon and aluminum, and may be the above materials whose surface is, if necessary, treated with carbon, nickel, titanium or silver. According to one embodiment of the present invention, the form of the positive electrode current collector may be selected from film, sheet, foil, net, porous body, foam, and nonwoven fabric. The thickness of the positive electrode current collector is not particularly limited and may be set in a suitable range in consideration of the mechanical strength of the positive electrode, the productivity, and the capacity of the battery.

The method of forming the positive electrode active layer on the current collector may be a known coating method and is not particularly limited. For example, a bar coating method, a screen coating method, a doctor blade method, a dipping method, a reverse roll method, a direct roll method, a gravure method, or an extrusion method may be applied as a coating method. The amount of application of the positive electrode active layer on the current collector is not particularly limited and is adjusted in consideration of the thickness of the desired positive electrode active layer. Further, before or after the process of forming the positive electrode active layer, a known process required for the preparation of a positive electrode, for example a rolling or drying process, can be performed.

The electrolyte constituting the lithium-sulfur secondary battery according to the present invention is not particularly limited as long as it is a non-aqueous solvent that acts as a medium through which ions involved in the electrochemical reaction of the battery can migrate. According to one embodiment of the present invention. The solvent may be a carbonate-based solvent, an ester-based solvent, an ether-based solvent, a ketone-based solvent, an alcohol-based solvent or an aprotic solvent. The carbonate-based solvent may be specifically dimethyl carbonate(DMC), diethyl carbonate(DEC), dipropyl carbonate(DPC), methylpropyl carbonate(MPC), ethylpropyl carbonate(EPC), methylethyl carbonate(MEC), ethylene carbonate(EC), propylene carbonate(PC), butylene carbonate(BC) or the like. The ester-based solvent may be specifically methyl acetate, ethyl acetate, n-propyl acetate, 1,1-dimethylethyl acetate, methyl propionate, ethyl propionate, γ-butyrolactone, decanolide, valerolactone, mevalonolactone, caprolactone or the like.

The ether-based solvent may be specifically diethyl ether, dipropyl ether, dibutyl ether, dimethoxymethane, trimethoxyethane, dimethoxyethane, diethoxy ethane, diglyme, triglyme, tetraglyme, tetrahydrofuran, 2-methyltetrahydrofuran, polyethylene glycol dimethyl ether, or the like. The ketone-based solvent may be specifically cyclohexanone and the like. The alcohol-based solvent may be specifically ethyl alcohol, isopropyl alcohol, or the like. The aprotic solvent may be specifically nitriles such as acetonitrile, amides such as dimethylformamide, dioxolanes such as 1,3-dioxolane (DOL), sulfolane or the like. The non-aqueous organic solvent may be used alone or in combination of two or more. When the mixture is used in a mixture of one or more, the mixing ratio can be appropriately adjusted according to the performance of the desired battery. In particular, a mixture of 1,3-dioxolane and dimethoxyethane in a volume ratio of 1:1 may be preferable.

The binder containing the acrylic polymer according to the present invention has a solubility of 5 wt. % or less, more preferably 1 wt. % or less in the above-described electrolyte, and thus the electrode is excellent in resistance to electrolyte and high cycle stability is exhibited The negative electrode of the lithium-sulfur battery according to the present invention includes a negative electrode current collector and a negative electrode active material layer formed on the negative electrode current collector.

The negative electrode active material layer comprises a negative electrode active material, a binder, and a conductive material. The negative electrode active material may include a material capable of reversibly intercalating or deintercalating lithium ion (Lit), a material capable of reversibly forming lithium containing compounds by reacting with lithium ion, or lithium metal or lithium alloy. The material capable of reversibly intercalating or deintercalating lithium ion (Lit) can be, for example, crystalline carbon, amorphous carbon, or a mixture thereof. The material capable of reacting with lithium ion (Lit) to reversibly form lithium containing compounds may be, for example, tin oxide, titanium nitrate or silicon. The lithium alloy may be, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

The binder is not limited to the binder including the acrylic polymer, but may be any binder that can be used as a binder in the art, including binders containing non-acrylic polymers The constitution of the current collector and the like except for the negative electrode active material and the conductive material may be selected from the materials and methods used in the positive electrode described above.

The separator of the lithium-sulfur battery according to the present invention is a physical separator having a function of physically separating the electrode and can be used without any particular limitations as long as it is used as a conventional separator. Especially, the separator is preferably a separator having excellent ability to impregnate the electrolyte, while showing a low resistance to the ion movement of the electrolyte.

In addition, the separator enables the transport of lithium ions between the positive electrode and the negative electrode, while separating or isolating the positive electrode and the negative electrode from each other. Such separator may be made of a porous, nonconductive or insulating material having a porosity of 30-50%.

Specifically, a porous polymer film, for example, a porous polymer film made of a polyolefin-based polymer such as ethylene homopolymer, propylene homopolymer, ethylene/butene copolymer, ethylene/hexene copolymer and ethylene/methacrylate copolymer, etc. may be used, or a nonwoven fabric made of glass fiber or the like with high melting point can be used. Of these, a porous polymer film is preferably used.

If the polymer film is used for both the buffer layer and the separator, the impregnation amount of the electrolyte and ion conductive characteristics are decreased, and the effect of reducing the overvoltage and improving the capacity characteristics becomes insignificant. On the contrary, if the nonwoven fabric materials are used for both, mechanical stiffness cannot be ensured and a short circuit problem occurs. However, if the film type separator and the polymer nonwoven fabric buffer layer are used together, it is possible to secure the mechanical strength along with the improvement effect of battery performance by adoption of the buffer layer.

According to one preferred embodiment of the present invention, a poly film of ethylene homopolymer (polyethylene) is used as a separator and a polyimide nonwoven fabric is used as a buffer layer. At this time, the polyethylene polymer film preferably has a thickness of 10 to 25 μm and a porosity of 40 to 50%.

Hereinafter, preferred examples of the present invention will be described in order to facilitate understanding of the present invention. However, the following examples are provided to facilitate understanding of the present invention, but the present invention is not limited thereto.

EXAMPLES

1. Preparation of Binder

Preparation Example 1: Binder of Acrylic Polymer (A1)

Into a 250 mL round bottom flask, 9 g of polyethyleneoxide methylether methacrylate, 6 g of N-vinyl-2-pyrrolidone, 4 g of acrylonitrile, 1 g of N-(3,4-dihydroxyphenylethyl) methacrylamide and 80 g of water were introduced and the inlet was sealed. Oxygen was removed by nitrogen bubbling for 30 minutes. The reaction flask was immersed in an oil bath heated to 60° C. and then 0.2 g of VA-057 (manufactured by Wako Chemical) was added to initiate the reaction. After 24 hours, the reaction was terminated and an acrylic copolymer was obtained (conversion: 99%, weight average molecular weight: 210,000).

Preparation Examples 2 to 4: Binders of Acrylic Polymer (A2 to A4)

An acrylic polymer was prepared in the same manner as in Preparation example 1, except that monomers used in the polymerization and their weight ratios were adjusted as shown in Table 1 below.

Comparative Preparation Example 1: Binder of Acrylic Polymer (B1)

An acrylic polymer was prepared in the same manner as in Preparation example 1, except that monomers used in the polymerization and their weight ratios were adjusted as shown in Table 1 below.

TABLE 1

|  |  | A1 | A2 | A3 | A4 | B1 |
|---|---|---|---|---|---|---|
| First acrylic monomer | PEOMA | 45 | 45 | 50 | 50 | 50 |
|  | DMAEMA |  |  |  | 10 | 10 |
|  | HEMA |  |  | 5 |  |  |
| Second acrylic monomer | MMA |  |  | 3 |  |  |
| Non-acrylic monomer | VP | 30 | 30 | 30 | 25 | 30 |
|  | AN | 20 | 20 | 10 | 10 | 10 |
|  | DMAA |  |  |  |  |  |
| Redox monomer | DMA | 5 |  | 2 | 5 |  |
|  | AsMA |  | 5 |  |  |  |
|  | $M_w/10^3$ | 210 | 195 | 250 | 200 | 320 |

PEOMA: Poly (ethylene oxide) methyl ether methacrylate
DMAEMA: 2-(N,N-dimethylamino)ethyl methacrylate
HEMA: 2-Hydroxyethyl methacrylate
MMA: Methyl methacrylate
VP: N-vinyl-2-pyrrolidone
AN: Acrylonitrile
DMAA: N,N-dimethylacrylamide
DMA: N-(3,4-dihydroxyphenylethyl)methacrylate
AsMA: 2-(3,4-dihydroxy-2,5-dihydrofuranyl)-1-hydroxyethyl methacrylate Comparative Preparation Example 2: Binder of Acrylic Polymer (B2)

Into a 250 mL round bottom flask, 6.0 g of acrylonitrile, 8.0 g of butyl acrylate, 60 g of N-methylpyrrolidone (NMP) were introduced and the inlet was sealed. Oxygen was removed by nitrogen bubbling for 30 minutes. The reaction flask was immersed in an oil bath heated to 60 and then 0.015 g of azobisisobutyronitrile (AIBN) was added to initiate the reaction. After 48 hours, the reaction was terminated and an acrylic copolymer was obtained (conversion: 93%, weight average molecular weight: 220,000).

Comparative Preparation Example 3: Binder of Polyfluorinated Vinylidene (PVDF)(B3)

The binder of polyfluorinated vinylidene (PVDF) was a reagent from Sigma-Aldrich as a binder commonly used in the art.

Comparative Preparation Example 4: Binder of Mixture of Styrene-Butadiene Rubber (SBR) and Carboxymethyl Cellulose (CMC) (B4)

Styrene-butadiene rubber (SBR) and carboxymethyl cellulose (CMC) were each purchased from Sigma-Aldrich, and styrene-butadiene rubber (SBR) and carboxymethyl cellulose (CMC) were mixed at a weight ratio of 7:3 to prepare a binder.

2. Performance Evaluation of Binder (1) Experimental Method

Measurement Method of Solubility 1 g of solute (monomer or polymer) was added to 5 g of solvent (water or electrolyte), and stirred for 30 minutes at room temperature (25° C.) to remove undissolved residual solute. The amount of the residual solute removed was measured to determine the amount of the solute dissolved in the solvent, and the solubility was measured by converting the measured amount into the value for 100 g of the solvent.

Measurement Method of Conversion Rate of Polymer

The reactants were diluted in the solvent to a concentration of 20 mg/mL, and 5 mg/mL of toluene was added as a standard material, followed by measurement of gas chromatography (PerkinElmer). The conversion rate is calculated from the change in the ratio of the monomer peak size to the area of the toluene peak.

<Analysis Condition>
Solvent: tetrahydrofuran
Initial temperature: 3 min at 50° C., Ramp: 30° C./min from 200° C.
Injection volume: 0.5 μL <Calculation of Conversion Rate>

Conversion rate (%)=$(A_{ini}-A_{fin})/A_{ini}$×100

$A_{ini}$: the area ratio of the monomer peak to the toluene peak at the start of the reaction
$A_{fin}$: the area ratio of the monomer peak to the toluene peak at the end of the reaction Measurement Method of Molecular Weight of Polymer The weight average molecular weight (Mw) and the molecular weight distribution (PDI) were measured using GPC under the following conditions, and the measurement results were converted using standard poly styrene of Agilent system for the drawing of the calibration curve.

<Measurement Condition>
Measuring instrument: Agilent GPC (Agilent 1200 series, U.S.)
Column: PLGel-M, PLGel-L series connection
Column temperature: 40° C.
Eluent: N,N-dimethylformaldehyde
Flow rate: 1.0 mL/min
Concentration: ~1 mg/mL (100 μL injection)

Preparation of Positive Electrode

A mixture of carbon powder and sulfur in a weight ratio of 10:90 was subjected to a wet ball milling process to obtain a carbon and sulfur composite. A positive electrode laminate (75.0 wt. % of the carbon and sulfur composite, 20.0 wt. % of Super-P (conductive material), 5.0 wt. % of the binder) was added to the solvent water to form a positive electrode slurry, and then the slurry was coated on the aluminum current collector having a thickness of 20 μm and dried at 80° C. for 12 hours to prepare a positive electrode having a loading amount of 2.0 mAh/cm². When the solvent was N-methylpyrrolidone, it was dried at 80° C. for 24 hours to prepare a positive electrode having a loading amount of 2.0 mAh/cm².

Manufacture of Battery

In order to constitute the battery, the above-mentioned positive electrode, the lithium foil having a thickness of 150 μm as a negative electrode, and the polyolefin film (CelgardR 2400) as a separator were used. Also, the electrolyte prepared by dissolving 0.38M LiN $(CF_3SO_2)_2$ and 0.31M $LiNO_3$ in a mixture of 1,3-dioxolane and dimethoxyethane was used to prepare a battery.

Evaluation Method of Cycle Characteristics
Instrument: 100 mA grade charging/discharging device
Charging: 0.1 C, constant current/constant voltage mode
Discharging: 0.1 C, constant current mode, 1.5 V
Cycle temperature: 25° C.

(2) Evaluation of Binder Performance

Example 1: Evaluation of the Performance of the Binder (A1) According to Preparation Example 1

A positive electrode was prepared using the acrylic polymer (A1) prepared in Preparation Example 1 as a binder, and a battery including the positive electrode, the negative electrode, the separator and the electrolyte was prepared according to the above description. After an evaluation of 100 cycles between 1.5 V and 2.8 V at charging/discharging 0.1 C/0.1 C, the capacity maintenance rate was measured by calculating the remaining capacity in the second cycle and the remaining capacity in the 50th cycle relative to the initial capacity. The results are shown in Table 2 below.

Example 2 to 4: Evaluation of the Performances of the Binders (A2 to A4) According to Preparation Examples 2 to 4

The capacity maintenance rate was measured in the same manner as in Example 1, except that positive electrodes were prepared using the binders (A2 to A4) prepared according to Preparation examples 2 to 4, and the results are shown in Table 2 below.

Comparative Examples 1 to 4: Evaluation of the Performances of the Binders (B1 to B4) According to Comparative Preparation Examples 1 to 4

The capacity maintenance rate was measured in the same manner as in Example 1, except that positive electrodes were prepared using the binders (B1 to B4) prepared according to Comparative preparation examples 1 to 4, and the results are shown in Table 2 below.

TABLE 2

|  | Example 1 | Example 2 | Example 3 | Example 4 | Comparative example 1 | Comparative example 2 | Comparative example 3 | Comparative example 4 |
|---|---|---|---|---|---|---|---|---|
| Binder | A1 | A2 | A3 | A4 | B1 | B2 | B3 | B4 |
| Binder solvent | Water | Water | Water | Water | Water | NMP | NMP | Water |
| Solubility in Electrolyte (wt. %) | 0.4 | 0.5 | 0.6 | 0.3 | 0.3 | >10 | 0.1 | <1 |
| Solubility in water (wt. %) | >20 | >20 | >20 | >20 | >20 | <1 | <1 | <5 |
| Capacity maintenance rate (%) | 90 | 90 | 85 | 88 | 60 | 60 | 75 | 82 |

According to the above Table 2, it was confirmed that when the acrylic polymers according to the present invention as in Examples 1 to 4 were used as a binder, as the cycle is progressed, the capacity maintenance rates were high. It is considered that this is due to the fact that the acrylic polymer according to the present invention physically and chemically combines with components in the electrode active layer to form a stable electrode having high resistance to an electrolyte and the leaching of sulfur-based materials into the electrolyte was effectively suppressed by supporting the reduction reaction of the polysulfide. Also, in the case of the acrylic polymer according to the present invention, since water can be applied as a dispersion solvent, the electrode drying time can be shortened compared to the case where NMP is used as a dispersion solvent, thereby achieving high productivity.

Particularly, in comparison with the comparative example 1, the acrylic polymer of the present invention includes a redox monomer polymerized unit and thus has a high capacity maintenance rate even by using a small amount of a dispersant for the conductive material. On the contrary, in the case of comparative example 1, excess dispersant for the conductive material is used to increase capacity maintenance rate. Also, the binder according to the present invention exhibits a capacity maintenance rate equal to or higher than that of the binder (B4) previously used in the related art.

As can be seen from the above, the acrylic polymer of the present invention has an excellent effect in improving the cycle characteristics of the lithium-sulfur battery. The battery using the thus prepared positive electrode exhibits excellent cycle characteristics and can make it possible to secure high manufacturing productivity.

All the modifications and variations are intended to be included within the scope of the present invention, and the specific scope of protection of the present invention will be clarified by the appended claims.

The invention claimed is:

1. A binder for a positive electrode of a lithium-sulfur secondary battery, comprising:
   an acrylic polymer, wherein the acrylic polymer comprises
      an acrylic monomer polymerized unit,
      a non-acrylic monomer polymerized unit, and
      a redox monomer polymerized unit,
   wherein the acrylic polymer comprises the acrylic monomer polymerized unit in an amount of 30 wt. % or more based upon a total weight of the acrylic polymer.

2. The binder for the positive electrode of the lithium-sulfur secondary battery according to claim 1, wherein acrylic monomer in the acrylic monomer polymerized unit comprises 30 wt. % or more of a first acrylic monomer based upon a total weight of the acrylic monomer, and the first acrylic monomer has a solubility of 20 wt. % or more in water at 25° C.

3. The binder for the positive electrode of the lithium-sulfur secondary battery according to claim 2, wherein the first acrylic monomer is at least one selected from the group consisting of alkoxy alkyleneglycol (meth)acrylic acid ester, alkoxy dialkyleneglycol (meth)acrylic acid ester, alkoxy polyethyleneglycol (meth)acrylic acid ester, 2-aminoethyl (meth)acrylate hydrochloride, N,N-dimethylaminoethyl (meth)acrylate, 2-hydroxyethyl (meth)acrylate, hydroxypolyethyleneglycol (meth)acrylate, hydroxypolypropyleneglycol (meth)acrylate, hydroxypolyalkyleneglycol (meth)acrylate, and methyl(meth)acrylic acid.

4. The binder for the positive electrode of the lithium-sulfur secondary battery according to claim 2, wherein the acrylic monomer in the acrylic monomer polymerized unit further comprises 1 to 50 parts by weight of a second acrylic monomer based on 100 parts by weight of the first acrylic monomer, and the second acrylic monomer has a solubility of 10 wt. % or less in water at 25° C.

5. The binder for the positive electrode of the lithium-sulfur secondary battery according to claim 4, wherein the second acrylic monomer is at least one selected from the group consisting of methyl (meth)acrylate, ethyl (meth)acrylate, n-propyl (meth)acrylate, isopropyl (meth)acrylate, n-butyl (meth)acrylate, t-butyl (meth)acrylate, isobutyl (meth)acrylate, 2-ethylhexyl (meth)acrylate, 2-ethylbutyl (meth)acrylate, pentyl (meth)acrylate, hexyl (meth)acrylate, cyclohexyl (meth)acrylate, n-octyl (meth)acrylate, isooctyl (meth)acrylate, isononyl (meth)acrylate, decyl (meth)acrylate, dodecyl (meth)acrylate, tridecyl (meth)acrylate, tetradecyl (meth)acrylate, octadecyl (meth)acrylate and isobornyl (meth)acrylate.

6. The binder for the positive electrode of the lithium-sulfur secondary battery according to claim 1, wherein non-acrylic monomer in the non-acrylic monomer polymerized unit is at least one selected from the group consisting of (meth)acrylamide, N-methyl (meth)acrylamide, N,N-dimethyl (meth)acrylamide, (meth)acrylonitrile, N-vinyl pyrrolidone, N-vinyl caprolactam, N-vinyl caprolactone, styrene, 2-vinyl pyridine, 4-vinyl pyridine and vinyl acetate.

7. The binder for the positive electrode of the lithium-sulfur secondary battery according to claim 1, wherein redox monomer in the redox monomer polymerized unit is N-(3,4-dihydroxyphenylethyl) (meth)acrylamide or 2-(3,4-dihydroxy-2,5-dihydrofuranyl)-1-hydroxyethyl (meth)acrylate.

8. The binder for the positive electrode of the lithium-sulfur secondary battery according to claim 1, wherein the acrylic polymer comprises
   30 to 70 wt. % of the acrylic monomer polymerized unit;
   20 to 50 wt. % of the non-acrylic monomer polymerized unit; and
   1 to 20 wt. % of the redox monomer polymerized unit,
      wherein the wt. % is based upon a total weight of the acrylic polymer.

9. The binder for the positive electrode of the lithium-sulfur secondary battery according to claim 1, wherein the acrylic polymer has a solubility of 10 wt. % or more in water at 25° C.

10. The binder for the positive electrode of the lithium-sulfur secondary battery according to claim 1, wherein the acrylic polymer has a solubility of 1 wt % or less in an electrolyte at 25° C.

11. A composition for a positive electrode of a lithium-sulfur secondary battery, comprising the binder according to claim 1, a positive electrode active material, and a conductive material.

12. The composition for the positive electrode of the lithium-sulfur secondary battery according to claim 11, wherein the composition comprises 0.01 to 10 parts by weight of the binder based on 100 parts by weight of solid content in the composition.

13. The composition for the positive electrode of the lithium-sulfur secondary battery according to claim 11, wherein the composition comprises 25 to 95 parts by weight of the positive electrode active material based on 100 parts by weight of solid content in the composition.

14. The composition for the positive electrode of the lithium-sulfur secondary battery according to claim 11, wherein the composition comprises 2 to 70 parts by weight of the conductive material based on 100 parts by weight of solid content in the composition.

15. A positive electrode for a lithium-sulfur secondary battery, comprising a current collector, and an active layer formed by applying the composition according to claim 11 on the current collector, wherein the active layer has a thickness of 1 to 200 μm.

\* \* \* \* \*